Jan. 3, 1950        K. L. HANSEN        2,493,403

SYNCHRONOUS RECTIFIER AND INVERTER

Filed Jan. 27, 1948        2 Sheets-Sheet 1

INVENTOR.
Klaus L. Hansen
BY
Arthur R. Woolfolk
Attorney

Jan. 3, 1950     K. L. HANSEN     2,493,403
SYNCHRONOUS RECTIFIER AND INVERTER
Filed Jan. 27, 1948     2 Sheets-Sheet 2
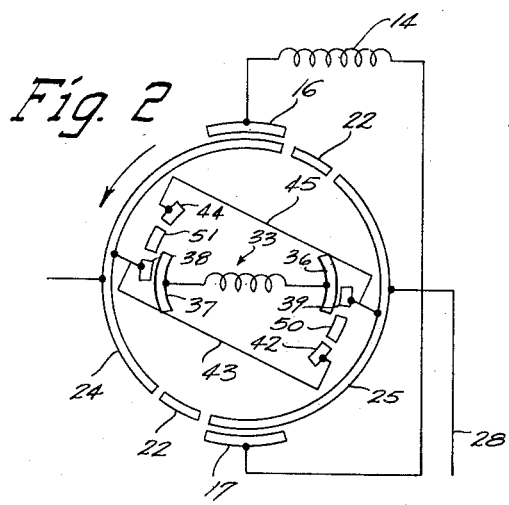
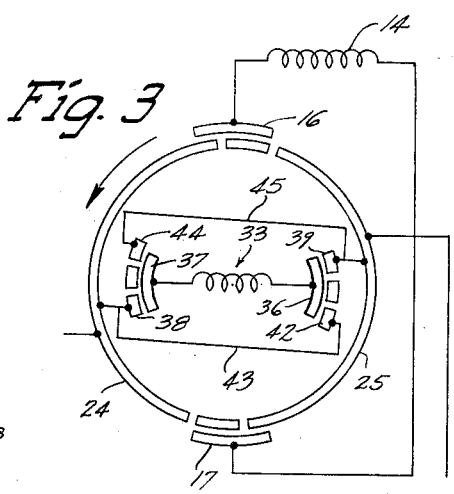
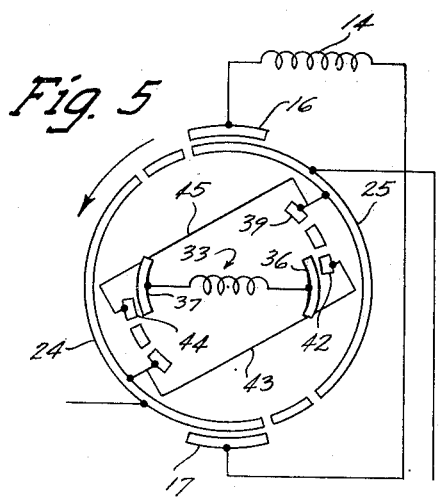
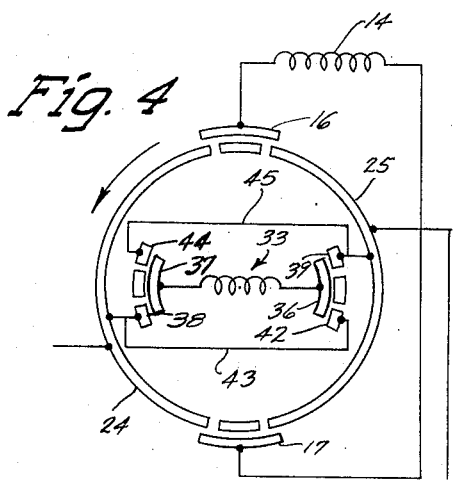
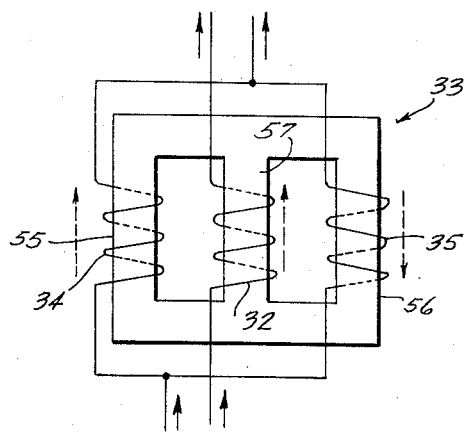
INVENTOR.
Klaus L. Hansen
BY
Arthur R. Woolfolk
Attorney Patented Jan. 3, 1950

2,493,403

UNITED STATES PATENT OFFICE 2,493,403

SYNCHRONOUS RECTIFIER AND INVERTER

Klaus L. Hansen, Milwaukee, Wis.

Application January 27, 1948, Serial No. 4,638

11 Claims. (Cl. 321—50)

This invention relates to a synchronous rectifier and inverter and is an improvement over that disclosed in my Patent No. 2,358,926 of September 26, 1944, for Commutation means and methods of commutation.

Objects of this invention are to provide a synchronous rectifier and inverter for polyphase alternating currents in which a plurality of main commutators are provided and act as rectifying commutators and are connected by means of brushes in the several phases, and in which a single impedance, preferably in the form of a reactor, is arranged to be used in succession as a by-pass for each of the main rectifying commutators during rectification at the corresponding main commutator and in the event the main commutators are connected to the secondaries of transformers for the different phases, arranged to provide in succession a by-pass around each transformer secondary to thus assist in carrying the rectified or load current during reversal of current in the corresponding secondary.

Further objects are to provide a synchronous rectifier having the characteristics enumerated hereinabove, in which a saturable, stationary reactor is employed whose impedance is caused to automatically and periodically fluctuate between maximum and minimum without switching means, which is so arranged that when the maximum current is transferred to the reactor as a parallel path, that such reactor will have minimum impedance, and on the other hand, when such reactor is first bridged across a secondary it will have maximum impedance to thereby limit the circulating current at that instant, and in which the point at which saturation of the reactor occurs is shifted with increasing load current.

Further objects are to provide a synchronous rectifier for alternating current which is provided with a reactor so made that its impedance decreases as the rectified or load current increases, and in which means are provided for driving the rectifier in synchronism with the alternating current and so constructed that the point at which rectification occurs in the alternating current cycle is automatically shifted as the load varies so that rectification occurs at the most advantageous point, thus minimizing sparking under all load conditions.

Further objects are to provide a synchronous rectifier for rectifying polyphase alternating currents in which, though a plurality of main commutators are provided and act as rectifying commutators, nevertheless, a single, stationary member is provided which acts as the impedance in the manner hereinabove set forth and which is preferably constructed as a stationary reactor, and in which this stationary reactor is successively connected in the proper sequence as a by-pass for the main segments and the secondaries of the transformers as hereinabove set forth.

Further objects are to provide a synchronous rectifier for rectification of polyphase alternating current, in which there is a minimum waste of energy, in which the energy stored in the reactor hereinabove mentioned is again transferred to the system during the rectification period and does not therefore appear as a dead loss as in the case of resistors, and in which the general efficiency or over-all efficiency of the rectifier is materially increased.

As stated hereinabove this invention is an improvement over that discussed in my above noted prior patent and the synchronous rectifier is so constructed that it will materially extend the range of that shown in my above noted patent and will handle higher voltages and larger loads.

An embodiment of the invention is shown in the accompanying drawings, in which:

Figure 2 is a view showing a portion of the commutating means in one position and the secondary of one of the transformers.

Figure 1:
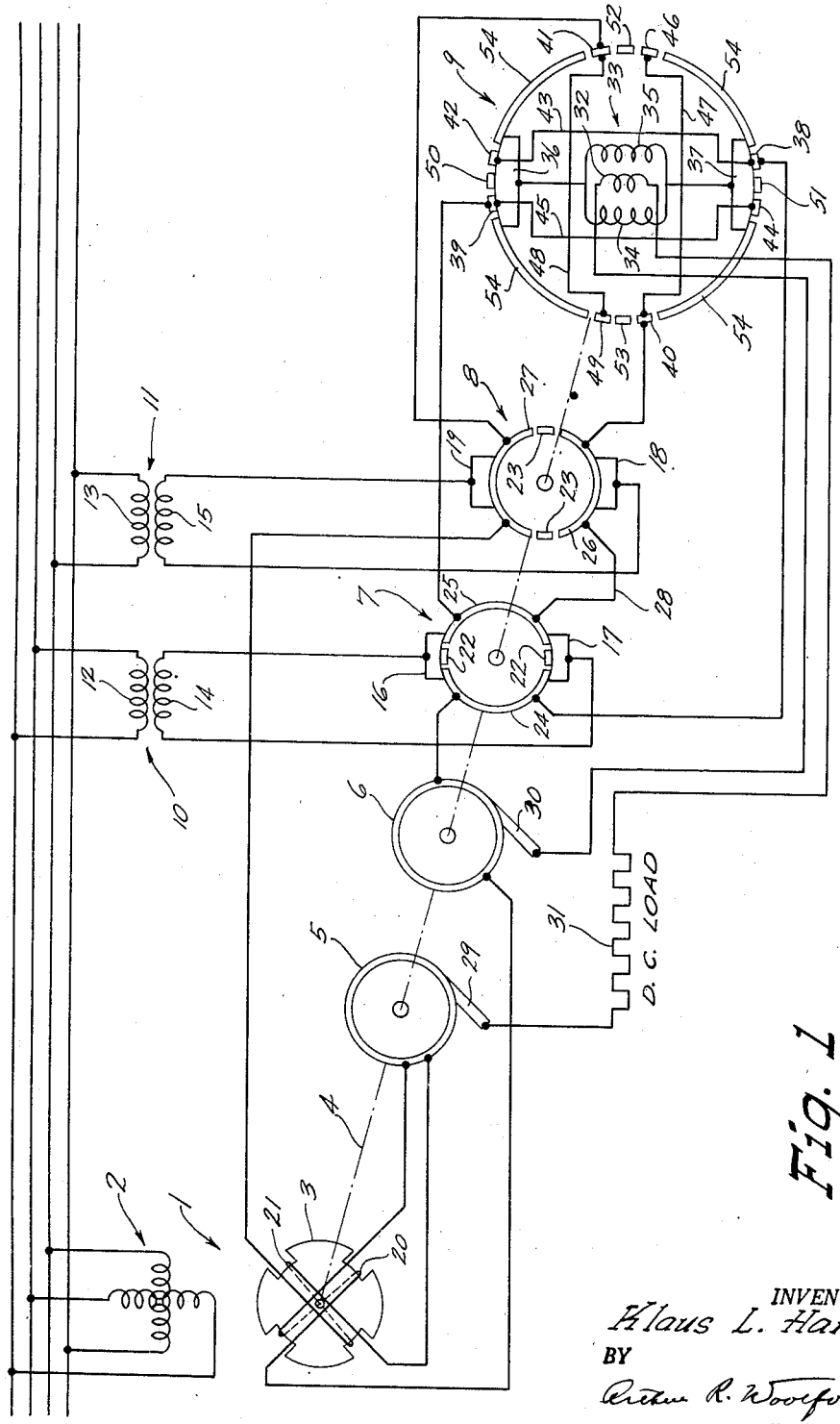
Figure 1 is a diagrammatic view showing the synchronous rectifier and inverter.

Figures 3, 4, and 5 show successive positions of the parts illustrated in Figure 2.

Figure 6 is a diagrammatic view showing the saturable reactor.

Before proceeding with the description, it is to be understood that the invention is equally applicable to a rectifier or to an inverter and may be so designed or arranged as to use a three phase, two phase, or other polyphase system. For the sake of simplicity in the disclosure and in the description, the invention has been shown and will be described as a rectifier for a two phase system.

Referring to Figure 1 it will be seen that a synchronous polyphase motor has been indicated generally by the reference character 1. It has a two phase stator indicated generally by the reference character 2 connected to the two phases as indicated. The rotor 3, through the medium of a shaft 4, drives a pair of slip rings 5 and 6, a pair of main rectifying commutators indicated generally by the reference characters 7 and 8, and an auxiliary commutator indicated generally by the reference character 9. A pair of transformers 10 and 11 have their primaries 12 and 13 connected to the two phases and have their secondaries 14 and 15 connected to the main brushes 16, 17 and 18, 19, respectively, of the main rectifying commutators 7 and 8. The rotor has been shown as a salient pole rotor, but it may be of any other suitable type. It is provided with a shunt winding 20 and with a series winding 21.

The main rectifying commutators 7 and 8 are provided, respectively, with dead segments 22 and 23. These dead segments are positioned between the active rectifying segments. The active rectifying segments of the main rectifying commutator 7 are indicated by the reference characters 24 and 25 and of the main rectifying commutator 8 by the reference characters 26 and 27. The reason for using dead segments 22 and 23 is to permit the use of relatively wide main brushes 16, 17, 18, and 19 without prolonging the time of short-circuiting the main segments of the respective main commutators 7 and 8.

It is to be noted that the series winding 21 of the rotor is connected between the slip ring 5 and the segment 27 of the main rectifying commutator 8, and that the shunt winding 20 is connected between the slip ring 5 and the slip ring 6. It is to be noted also that the segments 25 and 26 of the main rectifying commutators 7 and 8 are connected as indicated at 28. Brushes 29 and 30 bear on the slip rings 5 and 6, respectively, and are connected in series circuit with a direct current load indicated by the reference character 31. This series circuit includes the control winding 32 of a saturable, stationary reactor indicated by the reference character 33 and hereinafter described in detail. This saturable reactor is provided with a pair of coils 34 and 35 which are connected in parallel, and to brushes 36 and 37 which bear on the auxiliary commutator 9.

It is to be understood that the brushes 16, 17, 18, 19, 29, 30, 36, and 37 are stationary and that the rotor 3, the slip rings 5 and 6, the main rectifying commutators 7 and 8, and the auxiliary commutator 9 rotate synchronously. For the sake of clearness the saturable reactor indicated at 33 has been shown within the auxiliary commutator 9, but it is to be understood, as stated hereinabove, that the saturable reactor 33 is a stationary unit.

The auxiliary commutator 9 is provided with a plurality of diametrically, oppositely grouped pairs of active segments. For example, the active segment 38 is connected to the segment 24 of the main rectifying commutator 7 and the diametrically opposed active segment 39 is connected to the segment 25 of the main rectifying commutator 7. Similarly, the active segment 40 is connected to the segment 26 of the main rectifying commutator 8 and the diametrically opposed active segment 41 is connected to the segment 27 of the main rectifying commutator 8.

It is to be noted that the auxiliary commutator 9 is also provided with additional active segments. Active segment 42 is directly connected by means of conductor 43 with active segment 38. Active segment 44 is directly connected by means of conductor 45 with active segment 39. Active segment 46 is directly connected by means of conductor 47 with active segment 40. Active segment 41 is directly connected by means of conductor 48 with active segment 49.

It is to be noted that dead segments 50, 51, 52, and 53 are located between the respective series of active segments 39 and 42, 38 and 44, 41 and 46, 40 and 49. The auxiliary commutator 9 is also provided with a plurality of elongated dead segments 54 between the several groups of active segments as shown in Figure 1.

It is to be noted that the brushes 36 and 37 and the saturable reactor 30 are stationary, as previously stated, and that conductors 43, 45, 47, and 48 rotate as a unit with the auxiliary commutator 9.

Tracing out the main rectifying circuits, it will be seen that the secondaries 14 and 15 of the transformers 10 and 11, respectively, are successively connected in series and these connections are reversed at appropriate times, and that both secondaries 14 and 15 are connected eventually to the slip rings 5 and 6 and from there through the load circuit 31 and the control coil 32 of the saturable reactor. This is the circuit to which direct current is supplied. It is to be noted also that the load circuit includes the series winding 21 and that the shunt winding 20 is directly bridged across the slip rings 5 and 6. It is apparent, therefore, that as the direct current load increases, the effect of the series field 21 will increase. The arrangement is such that as the load increases and the effect of the series field 21 increases, that the armature automatically shifts backwardly from its normal position. In other words, there is a delay in the time of the switching for rectification, and at the auxiliary commutator.

It is to be noted also, as will appear from a description of the saturable reactor shown in greater detail in Figure 6, that the effect of the saturable reactor becomes less as the direct current load increases for a purpose hereinafter to appear.

Referring to Figure 6, it will be seen that the saturable reactor indicated generally at 33 is provided with a pair of outer cores 55 and 56 and a central core 57 connected by means of yokes at their opposite ends. The central core 57 and the outer cores 55 and 56, respectively, carry the windings 32, 34, and 35. The windings 34 and 35 are connected in parallel as shown. Assume that the direction of current flow is for any given instant, as indicated at Figure 6. It will be seen that the magnetic flux of the central core 57 and the outer core 55 is in the same direction and that the magnetic flux in the core 56 is in the opposite direction. The consequence of this is that the core 56 approaches saturation and, inasmuch as the windings 34 and 35 are in parallel, it is apparent that the lower impedance of the coil 35 has a predominant effect.

It is to be understood that the direction of current flow through the coils 34 and 35 reverses periodically and when it is in the reverse direction from that shown in Figure 6, it then will be apparent that the core 55 approaches saturation. However, the impedance, due to the coil 34 and its core, is the lesser impedance and being in parallel with the impedance of the coil 35 and its core, produces the predominant effect. Thus, irrespective of the direction of current flow through the coils 34 and 35, it will be found that the impedance of the saturable reactor is lowered as the direct current load increases, for the direct current load current passes through the coil 32 in the direction indicated in Figure 6.

The saturable reactor is not a standard type of saturable reactor. It is so made, as described hereinabove, that although the reactance of one of the coils increases with increase of load current through the control coil, the reactance of the other main current coil decreases due to saturation of its core, and in view of the fact that these two main coils 34 and 35 are in parallel, it is apparent that the total reactance of this parallel circuit is materially reduced below that of the winding on the unsaturated core and slightly reduced below that of the winding on the saturated core. A further point to be noted about the reactor is that it is so made that saturation will occur independently of the control coil 32 for the currents passing through the coils 34 and 35 are at current values far below full load current value. The purpose of this feature will be appreciated as the description proceeds.

A further point to be noted about the reactor is that it is subjected to a series of rapid current pulsations in one direction through the coils 34 and 35 followed by a series of rapid current pulsations in the other direction through such coils as the auxiliary commutator rotates.

Before proceeding with the detailed description of the mode of operation of the synchronous rectifier, it is to be understood that Figures 2, 3, 4, and 5 are simplified showings in which only one main rectifying commutator has been illustrated and only the secondary of one transformer. In addition to this, the control coil of the reactor has been omitted and a single coil replaces coils 34 and 35. The general reference character 33 has been used to indicate the reactor in Figures 2, 3, 4, and 5. The description of the operation will be given for a single, main rectifying commutator in conjunction with the auxiliary commutator and the reactor. This description is believed to be sufficient as the action of the auxiliary commutator in reference to the other main rectifying commutator is identically the same.

When the rectifier is running unloaded, that is to say not furnishing any direct current, the position of the parts at zero voltage in the alternating current cycle for the secondary 14 is shown in Figure 4. In other words, the rectifying segments 24 and 25 are short-circuited not only by the main brushes 16 and 17 but also by the conductors 43 and 45.

Consider Figures 2 through 5, when the rectifier is running unloaded. Under these conditions the reactor 33 is bridged across the segments 24 and 25 and consequently across the secondary 14 of the transformer before the voltage zero has been reached in the alternating current cycle. In view of the fact that the reactor is not saturated and has no current passing therethrough, it is apparent that it offers a relatively high impedance and prevents an enormous surge of current and holds the current surge to a medium and easily handled value. In the next instant when the parts have assumed the position shown in Figure 4 the segments 24 and 25 are short-circuited not only by the main brushes but also by the conductors 43 and 45. As the parts approach the position shown in Figure 4 from that shown in Figure 2, the reactor 33 becomes quickly saturated due to the current through the coils 34 and 35, see Figure 1, and consequently when the segments 24 and 25 are bridged by the conductors 43 and 45 there is not a very great increase in circulating current through the secondary—only a slight increase due approximately to the difference in resistance in the winding of the reactor and that of the conductors 43 and 45. However, this increase in circulating current through the secondary of the transformer is relatively small and does no damage. The switching from the position shown in Figure 2, through the position shown in Figure 4, to the position shown in Figure 5 is so rapid that the energy stored in the reactor 33 is not lost and the current continues to flow through the reactor 33 in the same direction. When the parts arrive at the position shown in Figure 5 the current is in the same direction as in Figures 2 and 4 but the voltage, however, has reversed in the secondary. This reversal of voltage in the secondary is balanced against, or in other words opposes the electromotive force of the reactor 33 which tends to resist decrease in current flow therethrough and builds up an electromotive force in the same direction as the initial current flow. The proportion of the parts and the design of the apparatus is such that at the instant the circuit is broken through the reactor 33, the two voltages, that is to say, the voltage induced in the secondary 14 in the reverse direction opposes the electromotive force of the reactor due to decrease of the current and is of substantially the same value. At approximately the instant that the current through the reactor is zero or, in other words, when the electromotive force of the reactor and the induced voltage in the secondary 14 of the transformer are substantially equal, the circuit through the reactor is interrupted. In other words, the auxiliary brushes 36 and 37 leave the auxiliary segments 42 and 44.

The currents discussed hereinabove can be referred to as the circulating current through the secondary of the transformer and as the term is used, it means the locally circulating current through the secondary of the transformer. This distinction is made so as to distinguish such circulating current from the load current that will hereinafter be described for the operation of the rectifier under load conditions. It is to be noted from Figure 3, which shows the position of the parts between that shown in Figure 2 and that shown in Figure 4, that it is preferable to have the main rectifying segments 24 and 25 short-circuited by means of the conductors 43 and 45 an instant before the main brushes 16 and 17 short-circuit such main rectifying segments. There is not an abnormal surge of current at this instant because of the leakage reactance of the transformer and because of the fact that the induced voltage is approaching zero value.

When the rectifier is operating under load conditions, the series field 21 retards the position of the rotor 3, that is to say, it moves it back from its neutral unloaded position and consequently delays the switching operations both of the main rectifying commutators and of the auxiliary commutator. In other words, the initial switching occurs as indicated in Figure 2 at a point which is closer to the voltage zero of the secondary 14 than when the rectifier is running unloaded. Under these conditions, the voltage impressed on the main windings 34 and 35 of the reactor is not sufficient to cause saturation of the reactor for the circulating current as defined hereinabove. However, this deficiency is overcome by the action of the control coil 32, see Figures 1 and 6 (the control coil having been omitted in Figures 2 through 5 for the sake of clearness). The reactor is precharged, so to speak, that is to say its cores carry a considerable amount of flux proportional to the load current and, therefore, though the voltage impressed on the main coils 34 and 35 of the reactor is less, nevertheless such reactor is quickly saturated in passing from its initial bridging position, just prior and as shown in Figure 2, to the position shown in Figure 4. The reactor prevents a large current surge when it bridges the main segments 24 and 25 but is quickly saturated due to its partially saturated condition due to the load current through the control coil. It, however, builds up an electromotive force during the initial bridging action which opposes any great rush of current. During the time the parts are passing from the position shown in Figure 2 to that shown in Figure 4, the reactor is fully saturated and very little increase in circulating current through the secondary 14 is caused by the short-circuiting of the main segments 24 and 25 by the conductors 43 and 45, as shown in Figure 4.

The current through the secondary 14 of the transformer continues in its original direction though the voltage has passed through zero and is reversed when the parts are in the position shown in Figure 4 under load conditions. This reverse voltage tends to decrease the current flow through the secondary 14 in its initial direction in opposition to the present direction of current in such secondary. When the parts pass to the position shown in Figure 5, the fully saturated reactor allows the load current, as well as any remaining circulating current, to pass freely therethrough as it offers minimum impedance and is substantially a direct low resistance connection between the main segments 24 and 25. This, therefore, allows the load current to flow, although the current in the secondary 14 of the transformer passes through zero and then reverses. By the time the auxiliary brushes 36 and 37 leave the auxiliary contacts 42 and 44 the secondary 14 of the transformer is in condition to carry the full load current.

It will be seen that a novel synchronous rectifier and inverter has been provided by this invention which will handle very much larger loads and higher voltages than synchronous rectifiers or inverters which depend on bridging resistors during the different stages of commutation. The reactor is so constructed that it prevents destructive current surges and limits the current surges to a reasonable or moderate value as described hereinabove.

Also it will be seen that the rectifier provides for a change in the characteristics of the reactor as the load increases and in addition to this, shifts the synchronous switching means consisting of the main and auxiliary commutators to a retarded position so as to allow the reverse voltage to build up to a higher value in the secondary undergoing commutation prior to the time that the circuit is interrupted through the reactor, to thus overcome the reactance of the reactor as well as the leakage reactance of the transformer and allow the transformer to take full load current at the time the circuit is broken through the reactor.

It will be seen further that there is minimum sparking produced at the main and auxiliary commutators even under heavy loads and with relatively high voltages. In the event that the device is used as an inverter, it is apparent that a source of direct current would replace the direct current load 31, see Figure 1, and that the direction of shift produced by the series field would be in the reverse direction from that hereinabove described.

It will be seen further that a synchronous rectifier and inverter has been provided by this invention in which the transformer units are stationary units and in which the reactor is a stationary unit, and in which a single reactor is employed for all phases.

While the disclosure has been directed to a two pole motor or arrangement, obviously a four pole motor or a motor with a greater number of poles could be employed without departing from the spirit of this invention. Under these conditions, for instance for a four pole motor, the two main segments would be sub-divided and the corresponding portions of each main segment connected together. It is to be understood, therefore, that the expression "two main segments" is not to be understood as meaning only two main segments.

Although this invention has been described in considerable detail, it is to be understood that such description is intended as illustrative rather than limiting, as the invention may be variously embodied and is to be interpreted as claimed.

I claim:

1. In a synchronous rectifier, a source of polyphase current, a synchronous motor driven from said source, a plurality of main rectifying commutators and an auxiliary commutator driven from said motor, said main rectifying commutators each having a pair of main segments, pairs of main brushes for each of said main rectifying commutators connected, respectively, in the several phases of said source of polyphase current, an impedance, said auxiliary commutator having pairs of auxiliary segments connected, respectively to the main segments of said main rectifying commutators, auxiliary brushes connected to said impedance and bearing on said auxiliary commutator, said auxiliary commutator and said auxiliary brushes being arranged to successively bridge said impedance across the main segments of said main commutators while commutation is taking place at the respective main commutators and to reverse said impedance while commutation is taking place at said auxiliary segments, means connecting a segment of one main commutator to a segment of another main commutator, a direct current load circuit, and means for leading the rectified current secured from all of the main rectifying commutators to said load circuit.

2. In a synchronous rectifier, a source of polyphase current, a synchronous motor driven from said source, a plurality of main rectifying commutators and an auxiliary commutator driven from said motor, said main rectifying commutators each having a pair of main segments, pairs of main brushes for each of said main rectifying commutators connected, respectively, in the several phases of said source of polyphase current, a reactor, said auxiliary commutator having pairs of auxiliary segments connected, respectively, to the main segments of said main rectifying commutators, auxiliary brushes connected to said reactor and bearing on said auxiliary commutator, said auxiliary commutator and said auxiliary brushes being arranged to successively bridge said reactor across the main segments of said main commutators while commutation is taking place at the respective main commutators and to reverse said reactor while commutation is taking place at said auxiliary segments, means connecting a segment of one main commutator to a segment of another main commutator, a direct current load circuit, and means for leading the rectified current secured from all of the main rectifying commutators to said load circuit.

3. In a synchronous rectifier, a source of polyphase current, a synchronous motor driven from said source, a plurality of main rectifying commutators and an auxiliary commutator driven from said motor, said main rectifying commutators each having a pair of main segments, pairs of main brushes for each of said main rectifying commutators connected, respectively, in the several phases of said source of polyphase current, a reactor, said auxiliary commutator having pairs of auxiliary segments connected, respectively, to the main segments of said main rectifying commutators, auxiliary brushes connected to said reactor and bearing on said auxiliary commutator, said auxiliary commutator and said auxiliary brushes being arranged to successively bridge said reactor across the main segments of said main commutators while commutation is taking place at the respective main commutators and to reverse said reactor while commutation is taking place at said auxiliary segments, means connecting a segment of one main commutator to a segment of another main commutator, a direct current load circuit, and means for leading the rectified current secured from all of the main rectifying commutators to said load circuit, said reactor being characterized by the fact of reaching saturation at current values well below full load current of said rectifier.

4. In a synchronous rectifier, a source of polyphase current, a synchronous motor driven from said source, a plurality of main rectifying commutators and an auxiliary commutator driven from said motor, said main rectifying commutators each having a pair of main segments, pairs of main brushes for each of said main rectifying commutators connected, respectively, in the several phases of said source of polyphase current, a reactor, said auxiliary commutator having pairs of auxiliary segments connected, respectively, to the main segments of said main rectifying commutators, auxiliary brushes connected to said reactor and bearing on said auxiliary commutator, said auxiliary commutator and said auxiliary brushes being arranged to successively bridge said reactor across the main segments of said main commutators while commutation is taking place at the respective main commutators, means connecting a segment of one main commutator to a segment of another main commutator, a direct current load circuit, and means for leading the rectified current secured from all of the main rectifying commutators to said load circuit, said reactor having a control coil connected in said load circuit and arranged to increase the tendency of said reactor to saturate as the load increases.

5. In a synchronous rectifier, a source of polyphase current, a synchronous motor driven from said source, a plurality of main rectifying commutators and an auxiliary commutator driven from said motor, said main rectifying commutators each having a pair of main segments, pairs of main brushes for each of said main rectifying commutators connected, respectively, in the several phases of said source of polyphase current, a reactor, said auxiliary commutator having pairs of auxiliary segments connected, respectively, to the main segments of said main rectifying commutators, auxiliary brushes connected to said reactor and bearing on said auxiliary commutator, said auxiliary commutator and said auxiliary brushes being arranged to successively bridge said reactor across the main segments of said main commutators while commutation is taking place at the respective main commutators, means connecting a segment of one main commutator to a segment of another main commutator, a direct current load circuit, and means for leading the rectified current secured from all of the main rectifying commutators to said load circuit, said motor having a series field coil connected in the load circuit and arranged to delay commutation in the alternating current cycle at both the main and auxiliary commutators as the load increases.

6. In a synchronous rectifier, a source of polyphase current, a synchronous motor driven from said source, a plurality of main rectifying commutators and an auxiliary commutator driven from said motor, said main rectifying commutators each having a pair of main segments, pairs of main brushes for each of said main rectifying commutators connected, respectively, in the several phases of said source of polyphase current, a reactor, said auxiliary commutator having pairs of auxiliary segments connected, respectively, to the main segments of said main rectifying commutators, auxiliary brushes connected to said reactor and bearing on said auxiliary commutator, said auxiliary commutator and said auxiliary brushes being arranged to successively bridge said reactor across the main segments of said main commutators while commutation is taking place at the respective main commutators, means connecting a segment of one main commutator to a segment of another main commutator, a direct current load circuit, and means for leading the rectified current secured from all of the main rectifying commutators to said load circuit, said motor having a series field coil and said reactor having a control coil connected in said load circuit and arranged to respectively delay commutation in the alternating cycle at the main and auxiliary commutators and increase the tendency of said reactor to saturate as the load increases.

7. In a synchronous rectifier, a source of polyphase current, a synchronous motor driven from said source, a plurality of main rectifying commutators and an auxiliary commutator driven from said motor, said main rectifying commutators each having a pair of main segments, pairs of main brushes for each of said main rectifying commutators connected, respectively, in the several phases of said source of polyphase current, a stationary reactor, said auxiliary commutator having pairs of auxiliary segments connected, respectively, to the main segments of said main rectifying commutators, auxiliary brushes connected to said stationary reactor and bearing on said auxiliary commutator, said auxiliary commutator and said auxiliary brushes being arranged to successively bridge said stationary reactor across the main segments of said main commutators while commutation is taking place at the respective main commutators and to reverse said reactor while commutation is taking place at said auxiliary segments, means connecting a segment of one main commutator to a segment of another main commutator, a direct current load circuit, and means for leading the rectified current secured from all of the main rectifying commutators to said load circuit.

8. In a device of the class described, a polyphase alternating current system and a direct current system, a synchronous motor connected to said polyphase system, a plurality of main rectifying commutators driven from said synchronous motor, a pair of main brushes connected to each phase of said polyphase system with one pair of brushes for each of said main rectifying commutators, a segment of one main commutator being connected to a segment of another main commutator, a pair of slip rings connected to other segments of said main rectifying commutators, brushes bearing on said slip rings and connected in said direct current system, a stationary reactor, an auxiliary commutator having pairs of auxiliary segments connected to the segments of said main rectifying commutators, and a pair of auxiliary brushes connected to said reactor and coacting with said auxiliary commutator to connect said reactor successively across the segments of said main commutators, respectively, when the main commutators are undergoing commutation and for reversing said reactor while commutation is taking place at said auxiliary segments.

9. A polyphase rectifier comprising commutating means for each phase for converting the alternating current for each phase into unidirectional current, a direct current work circuit, means arranged to connect all of the commutating means in series with the work circuit, a reactor characterized by the fact that it saturates for current values well below full load current, and means for bridging said reactor across the commutating means as said commutating means are respectively undergoing commutation and for reversing said reactor during commutation.

10. A polyphase rectifier comprising commutating means for each phase for converting the alternating current for each phase into unidirectional current, a direct current work circuit, means arranged to connect all of the commutating means in series with the work circuit, a single stationary reactor characterized by the fact that it saturates for current values well below full load current, and means for successively bridging said reactor across the commutating means as said commutating means are respectively undergoing commutation and for reversing said reactor during commutation.

11. A polyphase rectifier comprising commutating means for each phase for converting the alternating current for each phase into unidirectional current, a direct current work circuit, means arranged to connect all of the commutating means in series with the work circuit, a reactor characterized by the fact that it saturates for current values well below full load current, means for bridging said reactor across the commutating means as said commutating means are respectively undergoing commutation and for reversing said reactor during commutation, and means for partially presaturating said reactor as the load increases.

KLAUS L. HANSEN.

REFERENCES CITED

The following references are of record in the file of this patent:

UNITED STATES PATENTS

| Number | Name | Date |
|---|---|---|
| 2,155,090 | Janetschke | Apr. 18, 1939 |
| 2,188,361 | Koppelmann | Jan. 30, 1940 |
| 2,241,050 | Bedford | May 6, 1941 |
| 2,358,926 | Hansen | Sept. 26, 1944 |